United States Patent [19]

Nordby et al.

[11] Patent Number: 4,921,715

[45] Date of Patent: May 1, 1990

[54] METHOD FOR PROTECTING CITRUS FRUIT FROM CHILLING INJURY, AND FRUIT PROTECTED THEREBY

[76] Inventors: Harold E. Nordby, 804 Lake Jessie Dr., Winter Haven, Fla. 33881; Roy E. McDonald, 344 Cypress Landing Dr., Longwood, Fla. 32779

[21] Appl. No.: 292,832

[22] Filed: Jan. 3, 1989

[51] Int. Cl.$^5$ .............................................. A23B 7/16
[52] U.S. Cl. .................... 426/102; 426/273; 426/308; 426/310; 426/333
[58] Field of Search ............... 426/333, 102, 252, 273, 426/308, 310, 99, 335

[56] References Cited

U.S. PATENT DOCUMENTS

| | | | |
|---|---|---|---|
| 1,985,846 | 12/1934 | Trowbridge | 426/308 |
| 2,019,758 | 4/1935 | MacRill | 426/308 |
| 2,668,121 | 2/1954 | Rizzardi | 426/308 |
| 4,060,492 | 11/1977 | Yasui | 426/64 |
| 4,207,347 | 6/1980 | D'Atri | 426/102 |

FOREIGN PATENT DOCUMENTS 542626  6/1956  Canada ................................ 426/310

OTHER PUBLICATIONS

Williams, 1966, Oils, Fats and Fatty Foods, 4th ed., American Elsevier Publishing Co., Inc., New York, pp. 130–132.

Nagy, 1977 Citrus Science and Technology, vol. 1, pp. 38, 39, 44 and 45, Avi Publishing Company, Inc., Westport Conn.

*Primary Examiner*—Carolyn Paden
*Attorney, Agent, or Firm*—Duckworth, Allen, Dyer & Doppelt

[57] ABSTRACT

A method for protecting whole citrus fruit or vegetables from chilling injury comprises the step of treating the skin of the fruit or vegetable with a medium containing squalene or a squalene-derivative.

6 Claims, No Drawings

METHOD FOR PROTECTING CITRUS FRUIT FROM CHILLING INJURY, AND FRUIT PROTECTED THEREBY

BACKGROUND OF THE INVENTION

The present invention relates to methods and compositions for protecting fruit and vegetable commodities from chilling injury.

DESCRIPTION OF THE PRIOR ART

After harvesting, certain citrus fruit and vegetable commodities, such as grapefruit, are shipped to foreign markets. During transshipment, these commodities are usually kept at cooler temperatures to reduce spoilage, and also to function as a quarantine treatment against certain insect pests. In the past, grapefruits subjected to reduced storage temperatures (33°–40° F.) during shipment to foreign markets have been observed to suffer pitting or brown staining of the flavedo (rind) of the fruit; this pitting or staining, generally referred to as "chilling injury", or "CI," does not affect the fruit internally but renders the fruit unsightly and therefore reduces its market value.

SUMMARY OF THE INVENTION

The present invention is directed to a method for protecting whole fruit and vegetable commodities from chilling injury, comprising the step of treating the skin of the commodity with a medium containing squalene or a squalene-derivative, and thereafter promoting the synthesizing of squalene derivative within the skin of the citrus fruit in order to protect the commodity from chilling injury. In experimental testing, it has been found that squalene and a squalene-derivative compound, squalane, are effective in reducing the amount of chilling injury experienced in citrus fruit, particularly grapefruit, stored at reduced temperatures for extended periods of time.

DESCRIPTION OF THE PREFERRED EMBODIMENT

The present invention is based on a chilling injury study done on grapefruit over a number of months. The results of that study are described next.

Initially, the chilling injury study was begun with a collection of grapefruit on a monthly basis. A first half of the collected fruit was conditioned for one week at 60° F. while the second half was stored at 40° F. The first half was then placed with the second half at 40° F. for twelve or more weeks. The fruit was examined weekly for chilling injury.

After a period of approximately 6–7 weeks, the scan of the first half (i.e., initially stored at 60° F. for one week) was examined and a strong hydrocarbon band was observed in the thin layer chromatogram (TLC) of a total lipid extract of the fruit's flavedo. This band was only weakly detected in the lipids of the non-conditioned second half (i.e., initially stored at 40° F.).

Using a non-polar phase, the first gas chromatographic (GLC) analysis of these hydrocarbons showed a "$C_{28}$" in the 60° F. fruit, which was considered to be very unusual since even numbered alkanes are reported to be only minor citrus wax components. By dewaxing the fruit and analyzing the wax by TLC, the "$C_{28}$" element was shown to be a component of the epicuticular wax. Subsequently, the "$C_{28}$" component was identified as squalene by chromatographically comparing the compound before and after hydrogenation with respect to squalene and squalane standards.

About five months into the test, extended extractions of the grapefruit skin showed squalene to be essentially all extracted in a four-minute chloroform fruit dip. Using a conventional procedure, the alkanes and squalene were separated from the wax. As a result of this study, it was determined that the squalene composition was effective in preventing chilling injury.

As a result of this evaluation, commercial squalene and squalane were obtained from Sigma Chemical Company of St. Louis, Mo. Thereafter, a quantity of grapefruit was harvested, washed and dried, and the overripe and regreened fruit removed. The remaining fruit was then divided into six sets. Sets 1 (control-40° F. storage) and 2 (60° F. temperature conditioned) were boxed and stored under the usual procedure for whole grapefruit. Set 3 was sprayed with a 0.5% aqueous solution of Triton X-100 with a power sprayer. Sets 4, 5 and 6 were sprayed with the Triton X-100 mix supplemented with 1% squalane (Set 4) 0.25% squalene (Set 5) and 1% squalene (Set 6).

The four sprayed sets, after drying at room temperature for five minutes, were boxed and placed in 40° F. storage. At the end of weeks 3, 4 and 5 after storage, the six sets were individually evaluated. The results of that evaluation shows that the application of a squalene-containing compound or a squalene derivative (i.e. squalane) significantly increases the resistance of the fruit to chilling injury. The increase in resistance to chilling injury was greater with 1% squalene (set 4) than what was obtainable with fruit conditioned at 60° F. prior to storage at 40° F. (set 2).

Squalene has been known for many years to be effective as a protective compound from external injury for humans, fish and birds. From the above study, it also appears that squalene has effectiveness on fruits and vegetables for protecting such commodities from chilling injury. As is shown by the above-described study, this chilling injury protection is obtained by the application of the squalene itself to the commodities and perhaps permitting the synthesis of squalene derivatives to take place.

What is claimed is:

1. A method for protecting whole citrus fruit from chilling injury, comprising the step of treating the outer surface of the skin of the fruit with a medium containing effective levels of squalene or a squalene-derivative composition to prevent the chilling injury.

2. The method recited in claim 1 wherein the citrus fruit comprises grapefruit.

3. The method recited in claim 1 further comprising the step of maintaining the citrus fruit in cold storage following treatment with the squalene or squalene-derivative containing composition.

4. A citrus fruit product treated in accordance with the method recited in claim 1.

5. A method for protecting whole grapefruit from chilling injury, comprising the steps of applying efficacious levels of squalene or a squalene-derivative to the skin of the fruit and then further promoting the synthesizing of squalene or squalene-derivative protectants within the flavedo of the grapefruit.

6. The method recited in claim 5, further comprising the step of thereafter maintaining the whole grapefruit at a reduced temperature of about 40° F. during storage or shipping.

* * * * *